US011874590B2

(12) United States Patent
Wang et al.

(10) Patent No.: US 11,874,590 B2
(45) Date of Patent: Jan. 16, 2024

(54) ILLUMINATION SYSTEM AND PROJECTION DEVICE

(71) Applicant: Coretronic Corporation, Hsin-Chu (TW)

(72) Inventors: Chun-Ju Wang, Hsin-Chu (TW); Wei-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/736,951

(22) Filed: May 4, 2022

(65) Prior Publication Data

US 2022/0365413 A1 Nov. 17, 2022

(30) Foreign Application Priority Data

May 12, 2021 (CN) .......................... 202110516245.X

(51) Int. Cl.
*G03B 21/20* (2006.01)
*H04N 9/31* (2006.01)
*G03B 21/14* (2006.01)

(52) U.S. Cl.
CPC ....... *G03B 21/2033* (2013.01); *G03B 21/142* (2013.01); *G03B 21/2053* (2013.01)

(58) Field of Classification Search
CPC .............. G03B 21/204; G03B 21/2013; H04N 9/3161; H04N 9/364; H04N 9/3158
See application file for complete search history.

(56) References Cited

U.S. PATENT DOCUMENTS

2015/0098065 A1* 4/2015 Tanaka ............... G03B 21/2013
353/84
2017/0343891 A1* 11/2017 Sakata ............... G03B 21/2013

FOREIGN PATENT DOCUMENTS

CN 109407451 3/2019
CN 109557750 4/2019

* cited by examiner

*Primary Examiner* — Ryan D Howard
(74) *Attorney, Agent, or Firm* — JCIPRNET

(57) ABSTRACT

An illumination system including multiple light sources, a first light combining module, a second light combining module, and a converging lens is provided. The light sources respectively provide multiple beams with the same wavelength range. The first light combining module is disposed on a transmission path of a portion of the beams. The second light combining module is disposed on a transmission path of another portion of the beams to combine the beams into an exciting beam. The converging lens is disposed on a transmission path of the exciting beam.

18 Claims, 6 Drawing Sheets

ILLUMINATION SYSTEM AND PROJECTION DEVICE

CROSS-REFERENCE TO RELATED APPLICATION

This application claims the priority benefit of China application serial no. 202110516245.X, filed on May 12, 2021. The entirety of the above-mentioned patent application is hereby incorporated by reference herein and made a part of this specification.

BACKGROUND

Technical Field

The disclosure relates to an optical system and an electronic device, and more particularly, to an illumination system and a projection device.

Description of Related Art

A laser projector is a product that uses a blue laser as a light source, emits light to the phosphor, and filters the light through a color wheel and reflects an image onto a projection screen by a digital light processing (DLP) element after exciting red light and green light. In recent years, in order to reduce the cost of the light source module, many different packaging forms have also derived from the solid-state laser light source. Generally speaking, the luminous flux that may be achieved by one or two light source modules is about 2000 to 5000 lumens. However, if a laser projector with higher brightness is to be introduced, more than two light source modules is needed. As a result, how to combine the light source and design the light path to achieve high brightness has become an urgent issue for those skilled in the art to work on.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system and a projection device, which may improve a brightness of a system, save assembly time, reduce production costs, and improve an efficiency of a manufacture.

Other objects and advantages of the disclosure may be further understood from the technical features disclosed herein.

In order to achieve one, a part, or all of the above objectives or other objectives, the disclosure provides an illumination system, which includes multiple light sources, a first light combining module, a second light combining module, and a converging lens. The light sources respectively provide multiple beams. The beams are beams with the same wavelength range. The first light combining module is disposed on a transmission path of a portion of the beams. The second light combining module is disposed on a transmission path of another portion of the beams to combine the beams into an exciting beam. The converging lens is disposed on a transmission path of the exciting beam.

In order to achieve one, a part, or all of the above objectives or other objectives, the disclosure provides a projection device, which includes an illumination system, a wavelength conversion element, a light homogenizing element, at least one light valve, and a projection lens. The illumination system is configured to provide an exciting beam. The illumination system includes multiple light sources, a first light combining module, a second light combining module, and a converging lens. The light sources respectively provide multiple beams. The beams are beams with the same wavelength range. The first light combining module is disposed on a transmission path of a portion of the beams. The second light combining module is disposed on a transmission path of another portion of the beams to combine the beams into the exciting beam. The converging lens is disposed on a transmission path of the exciting beam. The wavelength conversion element is configured to reflect the exciting beam at a first time interval, and convert the exciting beam into a converted beam at a second time interval. The light homogenizing element is configured to receive at least one of the exciting beam and the converted beam, and generate an illumination beam. The at least one light valve is disposed on a transmission path of the illumination beam to convert the illumination beam into an image beam. The projection lens is disposed on a transmission path of the image beam to project the image beam out of the projection device.

Based on the above, the embodiments of the disclosure have at least one of the following advantages or effects. In the illumination system and the projection device of the disclosure, the illumination system includes the light sources, the first light combining module, the second light combining module, and the converging lens. The first light combining module is disposed on the transmission path of a portion of the beams, and the second light combining module is disposed on the transmission path of another portion of the beams to combine the beams into the exciting beam. In addition, a single optical substrate may have different areas by different coating methods to form the first light combining module and the second light combining module, thereby improving the brightness of the system, saving the assembly time, reducing the production costs, and improving the efficiency of the manufacture.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
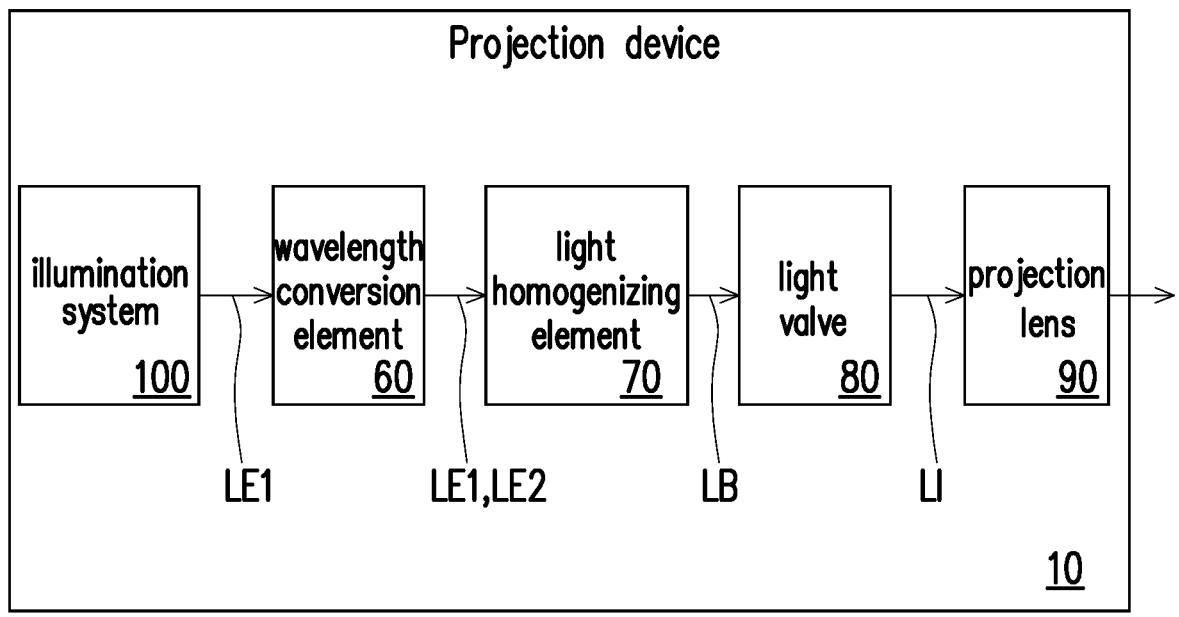
FIG. 1 is a schematic view of a projection device according to an embodiment of the disclosure.

FIG. 1 is a schematic view of a projection device according to an embodiment of the disclosure. In this embodiment, a projection device 10 is provided, which includes an illumination system 100, a wavelength conversion element 60, a light homogenizing element 70, at least one light valve 80, and a projection lens 90. The illumination system 100 is configured to provide an exciting beam LE1. The wavelength conversion element 60 is disposed on a transmission path of the exciting beam LE1 to convert the exciting beam LE1 into a converted beam LE2. The exciting beam LE1 and the converted beam LE2 leave the wavelength conversion element 60, and are transmitted to the light homogenizing element 70 sequentially. The light homogenizing element 70 is disposed on a transmission path of the exciting beam LE1 and the converted beam LE2 to generate an illumination beam LB. The at least one light valve 80 is disposed on a transmission path of the illumination beam LB to convert the illumination beam LB into an image beam L1. The projection lens 90 is disposed on a transmission path of the image beam L1 to project the image beam L1 out of the projection device 10 to a projection target (not shown), such as a screen or a wall.

Specifically, the wavelength conversion element 60 has a wavelength conversion material (such as a phosphor material) thereon to convert the exciting beam LE1 into the converted beam LE2. For example, the wavelength conversion element 60 may include at least one conversion area and an optical area. The at least one conversion area has the wavelength conversion material, and the conversion area is configured to convert the exciting beam LE1 with blue light into the converted beam LE2 with yellow, green, or yellow-green light at a first time interval. In different embodiments, the number and types of the conversion areas may be designed according to requirements, and the disclosure is not limited thereto. The optical area may reflect the exciting beam LE1 or increase a diffusion effect at a second time interval, and the disclosure is also not limited thereto.

The homogenizing element 70 is configured to receive at least one of the exciting beam LE1 and the converted beam LE2 to generate the illumination beam LB, and adjust a shape of a light spot of the illumination beam LB, so that the shape of the light spot of the illumination beam LB may match a shape of a working area of the light valve 80 (such as a rectangle), and the light spot has the same or close light intensity everywhere, which homogenizes a light intensity of the illumination beam LB. In this embodiment, the light homogenizing element 70 is, for example, an integrating rod, but in other embodiments, the light homogenizing element 70 may also be an optical element of other appropriate forms, such as a lens array (fly eye lens array). The disclosure is not limited thereto.

The light valve 80 is, for example, a reflective light modulator, such as a liquid crystal on silicon panel (LCoS panel) and a digital micro-mirror device (DMD). In some embodiments, the light valve 80 may also be a transmissive light modulator, such as a transparent liquid crystal panel, an electro-optical modulator, a magneto-optic modulator, and an acousto-optic modulator (AOM). The disclosure does not limit the form and type of the light valve 80. Regarding the method by which the light valve 80 converts the illumination beam LB into the image beam L1, detailed steps and implementation thereof may be sufficiently taught, suggested, and implemented by persons with ordinary knowledge in the art. Thus, details in this regard will not be further reiterated in the following. In the embodiment, the number of the light valves 80 is one, such as the projection device 10 using a single digital micro-mirror device; however, in other embodiments, the number may be plural. The disclosure is not limited thereto.

In addition, the projection lens 90 includes, for example, a combination of one or more optical lenses with diopter values, such as various combinations of non-planar lenses including, for example, biconcave lenses, biconvex lenses, concave-convex lenses, convex-concave lenses, plane-convex lenses, and plane-concave lenses, etc. In an embodiment, the projection lens 90 may further include planar optical lenses to project the image beam L1 from the light valve 80 to the projection target in a reflective manner. The disclosure does not limit the form and type of the projection lens 90.

In this embodiment, the projection device 10 further includes optical components such as an optical lens, a light splitting module, and a filter device 50. The optical lens is configured to converge and guide a beam to be transmitted to each of the components. The light splitting module is configured to guide the exciting beam LE1 and the converted beam LE2 to be transmitted to the light homogenizing element 70. The filter device 50 is disposed on the transmission path of the exciting beam LE1 and the converted beam LE2 to generate red light, green light, yellow light, or diffused blue light sequentially. However, the disclosure does not limit the type or form of the optical components such as the optical lens, the light splitting module, and the filter device 50. Detailed structure and implementation thereof may be sufficiently taught, suggested, and implemented by persons with ordinary knowledge in the art. Thus, details in this regard will not be further reiterated in the following.

Figure 2:
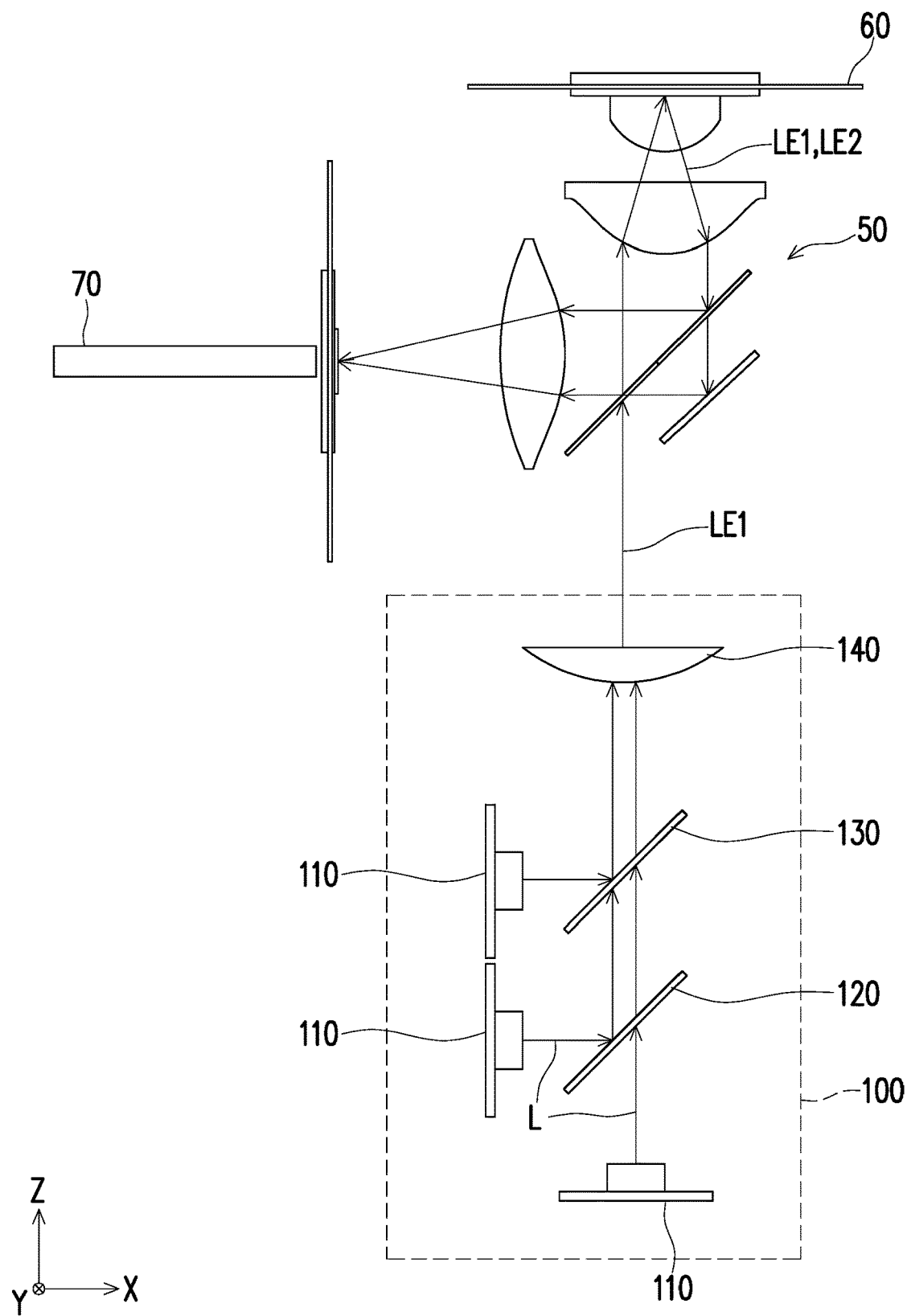
FIG. 2 is a schematic view of an illumination system according to an embodiment of the disclosure.
Figure 3:
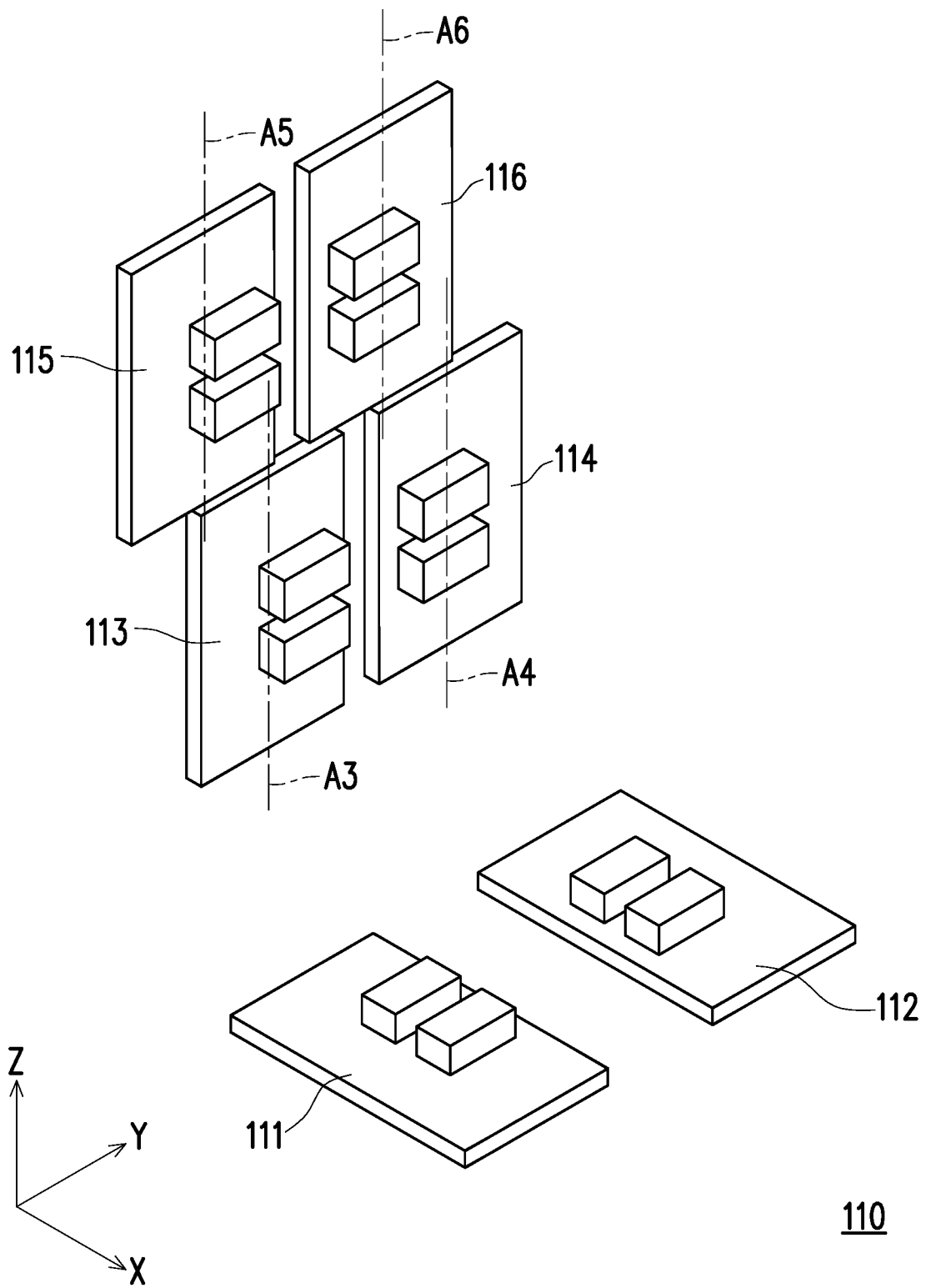
FIG. 3 is a schematic view of a light source of the illumination system of FIG. 2.
Figure 5A:
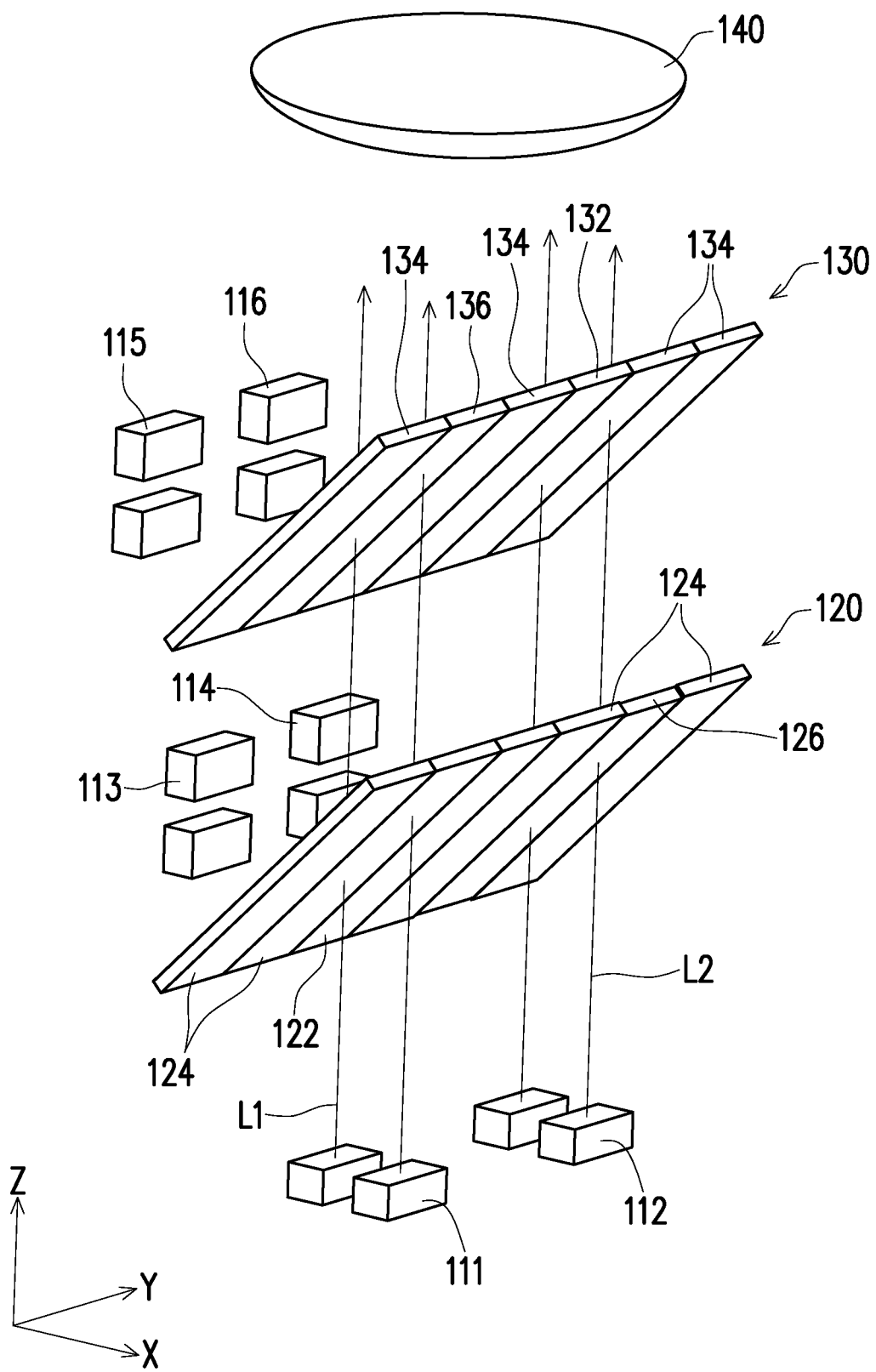
FIGS. 5A and 5B are respectively schematic views of a portion of the illumination system of FIG. 2 at different viewing angles.
Figure 5B:
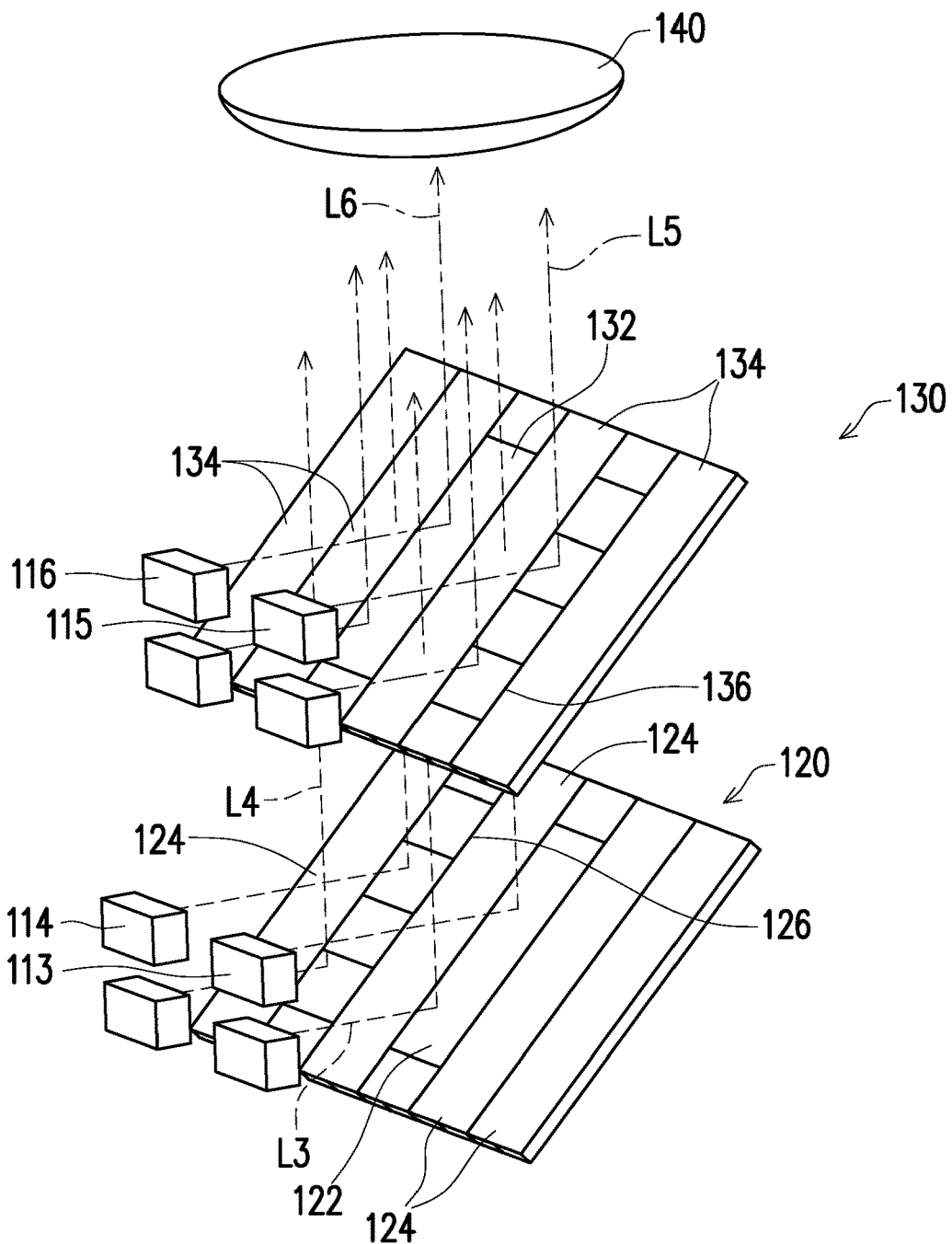

FIG. 2 is a schematic view of an illumination system according to an embodiment of the disclosure. FIG. 3 is a schematic view of a light source of the illumination system of FIG. 2. FIGS. 5A and 5B are respectively schematic views of a portion of the illumination system of FIG. 2 at different viewing angles. Referring to FIGS. 2 and 3, the illumination system 100 includes multiple light sources 110, a first light combining module 120, a second light combining module 130, and a converging lens 140. The light sources 110 respectively provide multiple beams L, and the beams L are beams with the same wavelength range. Specifically, referring to FIGS. 5A and 5B, in this embodiment, the light sources 110 include a first light source 111 providing a first beam L1, a second light source 112 providing a second beam L2, a third light source 113 providing a third beam L3, a fourth light source 114 providing a fourth beam L4, a fifth light source 115 providing a fifth beam L5, and a sixth light source 116 providing a sixth beam L6. The first light source 111 to the sixth light source 116 are all blue laser light emitting elements, so the first beam L1 to the sixth beam L6 are all blue beams. In this embodiment, the light sources 110 use a laser module with a four-in-one architecture. The laser module includes a circuit board that may be connected to an external signal. However, the disclosure is not limited thereto.

Continuing to refer to FIG. 3, in this embodiment, the first light source 111 to the sixth light source 116 are spaced apart from one another. For example, an interval between the first light source 111 and the second light source 112 (that is, a distance in a Y direction) is greater than or equal to 0.5 mm. An interval between the third light source 113 and the fourth light source 114 is greater than or equal to 0.5 mm, and an interval between the fifth light source 115 and the sixth light source 116 is greater than or equal to 0.5 mm. In addition, in this embodiment, the third light source 113 to the sixth light source 116 are misaligned with one another in the Y direction. For example, in the Y direction, there are the fifth light source 115, the third light source 113, the sixth light source 116, and the fourth light source 114 in sequence from left to right, thereby effectively making use of space. To further illustrate, a central axis A3 of the third light source 113 perpendicular to the Y direction does not coincide with a central axis A5 of the fifth light source 115 perpendicular to the Y direction, and a central axis A4 of the fourth light source 114 perpendicular to the Y direction does not coincide with a central axis A6 of the sixth light source 116 perpendicular to the Y direction. Therefore, a brightness of the illumination system 100 may be further improved. On the other hand, the first light source 111 and the second light source 112 are located on an XY plane, and the third light source 113 to the sixth light source 116 are located on a YZ plane, as shown in FIG. 3. In detail, the first light source 111, the second light source 112, and the third light source 113 to the sixth light source 116 are arranged in an L shape. Compared with a conventional T-shaped arrangement, the L-shaped arrangement may effectively reduce a volume of the illumination system 100.

Figure 4:
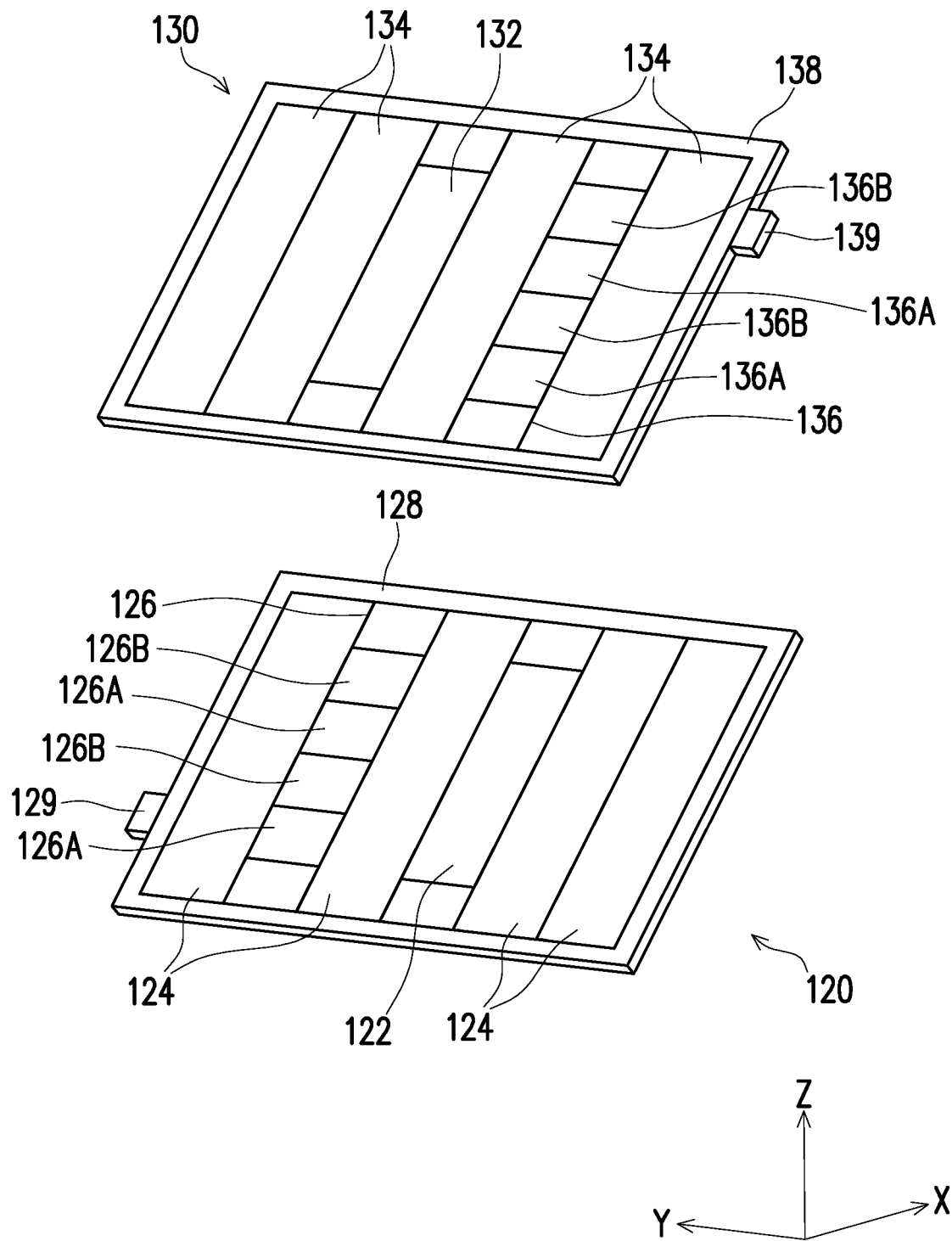
FIG. 4 is a schematic view of a first light combining module and a second light combining module of the illumination system of FIG. 2.

FIG. 4 is a schematic view of a first light combining module and a second light combining module of the illumination system of FIG. 2. Referring to FIGS. 2 and 4, the first light combining module 120 is disposed on a transmission path of a portion of the beams L, and the second light combining module 130 is disposed on a transmission path of another portion of the beams L to combine the beams L into the exciting beam LE1. In this embodiment, the first light combining module 120 and the second light combining module 130 has the same structure, and are arranged in a 180-degree flipping and symmetrical configuration; in another word, the second light combining module 130 is disposed in an inverted manner. The first light combining module 120 and the second light combining module 130 may be, for example, a single optical element. In detail, the first light combining module 120 includes a reflection area 122, multiple transmission areas 124, and a striped light splitting area 126. One of the transmission areas 124 is disposed between the reflection area 122 and the striped light splitting area 126. The reflection area 122 is configured to reflect the beams L. The transmission areas 124 are configured to allow the beams L to pass through. A portion of the area in the striped light splitting area 126 reflects the beams L, and a portion of the area allows the beams L to pass through. Similarly, similar to the first light combining module 120, the second light combining module 130 includes a reflection area 132, multiple transmission areas 134, and a striped light splitting area 136.

In this embodiment, the reflection area 122 is, for example, form by a reflective mirror or a reflective coating film. The transmission areas 124 are, for example, formed by air, light transmitting glass, or light transmitting plastic. The striped light splitting area 126 is, for example, formed by a dichroic mirror. In detail, the striped light splitting area 126 of the first light combining module 120 has a staggered arrangement of multiple sub-reflection areas 126A and multiple sub-transmission areas 126B. The sub-transmission areas 126B may be light transmitting elements (such as the light transmitting glass or light transmitting plastic), and the sub-reflection areas 126A may be formed by coating a film on a portion of the above light transmitting elements. However, the disclosure is not limited thereto. Similarly, the striped light splitting area 136 of the second light combining module 130 has a staggered arrangement of multiple sub-reflection areas 136A and multiple sub-transmission areas 136B. In other words, this method may utilize different coating methods on different areas of a single optical substrate, which may further save assembly time, reduce production costs, and improve an efficiency of a manufacture. In this embodiment, the first light combining module 120 and/or the second light combining module 130 further includes a frame 128/138 and an adjusting member 129/139. The frame 128/138 is configured to combine and fix the reflection area 122/132, the transmission areas 124/134, and the striped light splitting area 126/136. The adjusting member 129/139 is disposed on the frame 128/138 to adjust angles of the reflection area 122/132, the transmission areas 124/134, and the striped light splitting area 126/136. The adjusting member 129/139 shown in FIG. 4 is only for illustration, but the disclosure does not limit the number, structure, and shape of the adjusting element 129/139. Therefore, an angle of the first light combining module 120 and/or the second light combining module 130 may be further adjusted to optimize incident angles of the beams L, thereby improving an optical effect of the illumination system 100. In some embodiments, widths of the frames 128 and 138 may be further adjusted to move the adjusting members 129 and 139 outward, thereby preventing the adjusting members 129 and 139 from blocking a light path and improve the convenience of space adjustment.

Referring to FIGS. 2 and 3, the converging lens 140 is disposed on the transmission path of the exciting beam LE1. In detail, the first light combining module 120 and the second light combining module 130 are disposed between the first light source 111/the second light source 112 and the converging lens 140. The converging lens 140 is configured to focus and transmit the exciting beam LE1 to the optical components such as the light splitting module, the wavelength conversion element 60, and the optical lens.

Referring to FIGS. 4, 5A, and 5B, in detail, the first light source 111 and the second light source 112 respectively provide the first beam L1 and the second beam L2 toward the converging lens 140, and transmission directions of the first beam L1 and the second beam L2 are both parallel to an optical axis direction of the converging lens 140 (that is, parallel to a Z axis direction). More specifically, the first beam L1 is emitted by the first light source 111 and is sequentially transmitted through the transmission areas 124 of the first light combining module 120 and the sub-transmission areas 136B of the striped light splitting area 136 in the second light combining module 130, and then passes through the converging lens 140. The second beam L2 is emitted by the second light source 112 and is sequentially transmitted through the sub-transmission areas 126B of the striped light splitting area 126 in the first light combining module 120 and the transmission areas 134 of the second light combining module 130, and then passes through the converging lens 140.

The third light source 113 and the fourth light source 114 respectively provide the third beam L3 and the fourth beam L4 toward the first light combining module 120, and transmission directions of the third beam L3 and the fourth beam L4 are both perpendicular to the optical axis direction of the converging lens 140 (that is, perpendicular to the Z axis direction). More specifically, the third beam L3 is emitted by the third light source 113 and is reflected by the reflection area 122 of the first light combining module 120 and then passes through the transmission areas 134 of the second light combining module 130, and then passes through the converging lens 140. The fourth beam L4 is emitted by the fourth light source 114 and is reflected by the sub-reflection areas 126A of the striped light splitting area 126 in the first light combining module 120 and then passes through the transmission areas 134 of the second light combining module 130, and then passes through the converging lens 140.

The fifth light source 115 and the sixth light source 116 respectively provide the fifth beam L5 and the sixth beam L6 toward the second light combining module 130, and transmission directions of the fifth beam L5 and the sixth beam L6 are both perpendicular to the optical axis direction of the converging lens 140 (that is, perpendicular to the Z axis direction). More specifically, the fifth beam L5 is emitted by the fifth light source 115 and is reflected by the sub-reflection areas 136A of the striped light splitting area 136 in the second light combining module 130 and then passes through the converging lens 140. The sixth beam L6 is emitted by the sixth light source 116 and is reflected by the reflection area 132 of the second light combining module 130 and then passes through the converging lens 140.

In this embodiment, both the second beam L2 and the fourth beam L4 are incident to the striped light splitting area 126 of the first light combining module 120 and/or the transmission areas 134 of the second light combining module 130. Therefore, positions of the second light source 112 and the fourth light source 114 in the Y direction are the same, or an offset of the second light source 112 and the fourth light source 114 in the Y direction is less than or equal to 1 mm. Both the first beam L1 and the fifth beam L5 are incident to the striped light splitting area 136 of the second light combining module 130. Therefore, positions of the first light source 111 and the fifth light source 115 in the Y direction are the same, or an offset of the first light source 111 and the fifth light source 115 in the Y direction is less than or equal to 1 mm.

In this embodiment, there may be different coating methods or coating films on different areas of the single optical substrate to form the first light combining module 120 and the second light combining module 130, thereby saving the assembly time, reducing the production costs, and improving the efficiency of the manufacture.

Based on the above, in the illumination system and the projection device of the disclosure, the illumination system includes the light sources, the first light combining module, the second light combining module, and the converging lens. The first light combining module is disposed on the transmission path of a portion of the beams, and the second light combining module is disposed on the transmission path of another portion of the beams to combine the beams into the exciting beam. In addition, the single optical substrate may include different areas with different coating methods (coating films) to form the first light combining module and the second light combining module, thereby improving the brightness of the system, saving the assembly time, reducing the production costs, and improving the efficiency of the manufacture.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising a plurality of light sources, a first light combining module, a second light combining module, and a converging lens, wherein:

the plurality of light sources respectively provide a plurality of beams, and the plurality of beams are beams with a same wavelength range, wherein the plurality of light sources comprise a first light source providing a first beam, a second light source providing a second beam, a third light source providing a third beam, a fourth light source providing a fourth beam, a fifth light source providing a fifth beam, a sixth light source providing a sixth beam, and the plurality of beams comprise the first beam, the second beam, the third beam, the fourth beam, the fifth beam and the sixth beam;

the first light combining module is disposed on a transmission path of a portion of the plurality of beams;

the second light combining module is disposed on a transmission path of another portion of the plurality of beams and is configured to combine the plurality of beams into an exciting beam; and the converging lens is disposed on a transmission path of the exciting beam;

wherein the third light source, the fourth light source, the fifth light source and the sixth light source are misaligned with each other in a first direction, the third light source and the fourth light source are misaligned with the fifth light source and the sixth light source in an optical axis direction of the converging lens, the third beam and fourth beam are transmitted respectively from the third light source and the fourth light source to the first light combining module along a second direction, the fifth beam and sixth beam are transmitted respectively from the fifth light source and the sixth light source to the second light combining module along the second direction, and the first direction, the second direction, the optical axis direction of the converging lens are perpendicular to each other.

2. The illumination system according to claim 1, wherein the first light combining module and the second light combining module have a same structure, and the second light combining module is disposed in an inverted manner.

3. The illumination system according to claim 1, wherein transmission directions of the first beam and the second beam are both parallel to the optical axis direction of the converging lens.

4. The illumination system according to claim 2, wherein the first light combining module comprises a reflection area, a plurality of transmission areas, and a striped light splitting area, wherein one of the plurality of transmission areas is disposed between the reflection area and the striped light splitting area.

5. The illumination system according to claim 4, wherein the first light combining module further comprises a frame and an adjusting member, and the adjusting member is configured to adjust angles of the reflection area, the striped light splitting area, and the plurality of transmission areas.

6. The illumination system according to claim 4, wherein the striped light splitting area having a staggered arrangement of a plurality of sub-reflection areas and a plurality of sub-transmission areas.

7. The illumination system according to claim 6, wherein the first beam is sequentially transmitted to one of the plurality of transmission areas of the first light combining module and the plurality of sub-transmission areas of the striped light splitting area of the second light combining module, the second beam is sequentially transmitted to the plurality of sub-transmission areas of the striped light splitting area of the first light combining module and one of the plurality of transmission areas of the second light combining module, the third beam is reflected by the reflection area of the first light combining module and to be transmitted through one of the plurality of transmission areas of the second light combining module, the fourth beam is reflected by the plurality of sub-reflection areas of the striped light splitting area of the first light combining module and to be transmitted through one of the plurality of transmission areas of the second light combining module, the fifth beam is reflected to the converging lens by the plurality of sub-reflection areas of the striped light splitting area of the second light combining module, and the sixth beam is reflected to the converging lens by the reflection area of the second light combining module.

8. The illumination system according to claim 4, wherein the reflection area is formed by a reflective mirror or a reflective coating film, the striped light splitting area is formed by a dichroic mirror, and the plurality of transmission areas are formed by air, light transmitting glass, or light transmitting plastic.

9. A projection device, comprising an illumination system, a wavelength conversion element, a light homogenizing element, at least one light valve, and a projection lens, wherein:

the illumination system is configured to provide an exciting beam, wherein the illumination system comprises a plurality of light sources, a first light combining module, a second light combining module, and a converging lens, wherein:

the plurality of light sources respectively provide a plurality of beams, and the plurality of beams are beams with a same wavelength range, wherein the plurality of light sources comprise a first light source providing a first beam, a second light source providing a second beam, a third light source providing a third beam, a fourth light source providing a fourth beam, a fifth light source providing a fifth beam, a sixth light source providing a sixth beam, and the plurality of beams comprise the first beam, the second beam, the third beam, the fourth beam, the fifth beam and the sixth beam;

the first light combining module is disposed on a transmission path of a portion of the plurality of beams;

the second light combining module is disposed on a transmission path of another portion of the plurality of beams and is configured to combine the plurality of beams into the exciting beam; and the converging lens is disposed on a transmission path of the exciting beam, wherein the third light source, the fourth light source, the fifth light source and the sixth light source are misaligned with each other in a first direction, the third light source and the fourth light source are misaligned with the fifth light source and the sixth light source in an optical axis direction of the converging lens, the third beam and fourth beam are transmitted respectively from the third light source and the fourth light source to the first light combining module along a second direction, the fifth beam and sixth beam are transmitted respectively from the fifth light source and the sixth light source to the second light combining module along the second direction, and the first direction, the second direction, the optical axis direction of the converging lens are perpendicular to each other;

the wavelength conversion element is configured to reflect the exciting beam at a first time interval and convert the exciting beam into a converted beam at a second time interval;

the light homogenizing element is configured to receive at least one of the exciting beam and the converted beam to generate an illumination beam;

the at least one light valve is disposed on a transmission path of the illumination beam to convert the illumination beam into an image beam; and the projection lens is disposed on a transmission path of the image beam to project the image beam out of the projection device.

10. The projection device according to claim 9, wherein the first light combining module and the second light combining module have a same structure, and the second light combining module is disposed in an inverted manner.

11. The projection device according to claim 9, wherein transmission directions of the first beam and the second beam are both parallel to the optical axis direction of the converging lens.

12. The projection device according to claim 10, wherein the first light combining module comprises a reflection area, a plurality of transmission areas, and a striped light splitting area, wherein one of the plurality of transmission areas is disposed between the reflection area and the striped light splitting area.

13. The projection device according to claim 12, wherein the first light combining module further comprises a frame and an adjusting member, and the adjusting member is configured to adjust angles of the reflection area, the striped light splitting area, and the plurality of transmission areas.

14. The projection device according to claim 12, wherein the striped light splitting area having a staggered arrangement of a plurality of sub-reflection areas and a plurality of sub-transmission areas.

15. The projection device according to claim 14, wherein the first beam is sequentially transmitted to one of the plurality of transmission areas of the first light combining module and the plurality of sub-transmission areas of the striped light splitting area of the second light combining module, the second beam is sequentially transmitted to the plurality of sub-transmission areas of the striped light splitting area of the first light combining module and one of the plurality of transmission areas of the second light combining module, the third beam is reflected by the reflection area of the first light combining module and to be transmitted through one of the plurality of transmission areas of the second light combining module, the fourth beam is reflected by the plurality of sub-reflection areas of the striped light splitting area of the first light combining module and to be transmitted through one of the plurality of transmission areas of the second light combining module, the fifth beam is reflected to the converging lens by the plurality of sub-reflection areas of the striped light splitting area of the second light combining module, and the sixth beam is reflected to the converging lens by the reflection area of the second light combining module.

16. The projection device according to claim 12, wherein the reflection area is formed by a reflective mirror or a reflective coating film, the striped light splitting area is formed by a dichroic mirror, and the plurality of transmission areas are formed by air, light transmitting glass, or light transmitting plastic.

17. An illumination system, comprising a plurality of light sources, a first light combining module, a second light combining module, and a converging lens, wherein:

the plurality of light sources respectively provide a plurality of beams, and the plurality of beams are beams with a same wavelength range;

the first light combining module is disposed on a transmission path of a portion of the plurality of beams;

the second light combining module is disposed on a transmission path of another portion of the plurality of beams and is configured to combine the plurality of beams into an exciting beam; and the converging lens is disposed on a transmission path of the exciting beam, wherein the first light combining module and the second light combining module have a same structure, and the second light combining module is disposed in an inverted manner, wherein the plurality of light sources comprise a first light source providing a first beam, a second light source providing a second beam, a third light source providing a third beam, a fourth light source providing a fourth beam, a fifth light source providing a fifth beam, and a sixth light source providing a sixth beam, wherein the first light combining module comprises a reflection area, a plurality of transmission areas, and a striped light splitting area, wherein one of the plurality of transmission areas is disposed between the reflection area and the striped light splitting area.

18. A projection device, comprising an illumination system, a wavelength conversion element, a light homogenizing element, at least one light valve, and a projection lens, wherein:

the illumination system is configured to provide an exciting beam, wherein the illumination system comprises a plurality of light sources, a first light combining module, a second light combining module, and a converging lens, wherein:

the plurality of light sources respectively provide a plurality of beams, and the plurality of beams are beams with a same wavelength range;

the first light combining module is disposed on a transmission path of a portion of the plurality of beams;

the second light combining module is disposed on a transmission path of another portion of the plurality of beams and is configured to combine the plurality of beams into the exciting beam; and the converging lens is disposed on a transmission path of the exciting beam;

the wavelength conversion element is configured to reflect the exciting beam at a first time interval and convert the exciting beam into a converted beam at a second time interval;

the light homogenizing element is configured to receive at least one of the exciting beam and the converted beam to generate an illumination beam;

the at least one light valve is disposed on a transmission path of the illumination beam to convert the illumination beam into an image beam; and the projection lens is disposed on a transmission path of the image beam to project the image beam out of the projection device, wherein the first light combining module and the second light combining module have a same structure, and the second light combining module is disposed in an inverted manner, wherein the plurality of light sources comprise a first light source providing a first beam, a second light source providing a second beam, a third light source providing a third beam, a fourth light source providing a fourth beam, a fifth light source providing a fifth beam, and a sixth light source providing a sixth beam, wherein the first light combining module comprises a reflection area, a plurality of transmission areas, and a striped light splitting area, wherein one of the plurality of transmission areas is disposed between the reflection area and the striped light splitting area.

* * * * *